United States Patent
Bartik et al.

(10) Patent No.: US 10,599,567 B2
(45) Date of Patent: *Mar. 24, 2020

(54) NON-COHERENT READ IN A STRONGLY CONSISTENT CACHE SYSTEM FOR FREQUENTLY READ BUT RARELY UPDATED DATA

(71) Applicant: INTERNATIONAL BUSINESS MACHINES CORPORATION, Armonk, NY (US)

(72) Inventors: Jane H. Bartik, Poughkeepsie, NY (US); Nicholas C. Matsakis, Poughkeepsie, NY (US); Chung-Lung K. Shum, Wappingers Falls, NY (US); Craig R. Walters, Highland, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/727,169

(22) Filed: Oct. 6, 2017

(65) Prior Publication Data
US 2019/0108125 A1   Apr. 11, 2019

(51) Int. Cl.
*G06F 12/08* (2016.01)
*G06F 12/0815* (2016.01)
(Continued)

(52) U.S. Cl.
CPC ........ *G06F 12/0815* (2013.01); *G06F 12/084* (2013.01); *G06F 12/0842* (2013.01);
(Continued)

(58) Field of Classification Search
CPC ............ G06F 12/0808; G06F 12/0811; G06F 12/0815; G06F 12/084; G06F 12/0842; G06F 12/0828
See application file for complete search history.

(56) References Cited

U.S. PATENT DOCUMENTS 6,681,293 B1   1/2004   Solomon et al.
7,529,888 B2   5/2009   Chen et al.
(Continued)

OTHER PUBLICATIONS

Anders Kristensen et al., "Problem-Oriented Object Memory: Customizing Consistency," Hewlett Packard, HPL-95-85, Jul. 1995.
(Continued)

*Primary Examiner* — Masud K Khan
(74) *Attorney, Agent, or Firm* — Cantor Colburn LLP; William Kinnaman

(57) ABSTRACT

A technique relates to enabling a multiprocessor computer system to make a non-coherent request for a cache line. A first processor core sends a non-coherent fetch to a cache. In response to a second processor core having exclusive ownership of the cache line in the cache, the first processor core receives a stale copy of the cache line in the cache based on the non-coherent fetch. The non-coherent fetch is configured to obtain the stale copy for a predefined use. Cache coherency is maintained for the cache, such that the second processor core continues to have exclusive ownership of the cache line while the first processor core receives the stale copy of the cache line.

11 Claims, 5 Drawing Sheets

(51) Int. Cl.
  *G06F 12/0842* (2016.01)
  *G06F 12/084* (2016.01)
  *G06F 12/0811* (2016.01)
  *G06F 12/0808* (2016.01)
  *G06F 12/0817* (2016.01)

(52) U.S. Cl.
  CPC ...... *G06F 12/0808* (2013.01); *G06F 12/0811* (2013.01); *G06F 12/0828* (2013.01); *G06F 2212/602* (2013.01)

(56) References Cited

U.S. PATENT DOCUMENTS

| | | | |
|---|---|---|---|
| 7,802,058 B1* | 9/2010 | Miller | G06F 12/0815 |
| | | | 711/118 |
| 8,694,736 B2 | 4/2014 | Beers et al. | |
| 8,762,652 B2 | 6/2014 | Moyer | |
| 2006/0106995 A1 | 5/2006 | Shen | |
| 2008/0320233 A1* | 12/2008 | Kinter | G06F 12/0804 |
| | | | 711/143 |
| 2012/0159080 A1* | 6/2012 | Donley | G06F 12/0806 |
| | | | 711/141 |
| 2013/0046936 A1* | 2/2013 | Tran | G06F 9/30047 |
| | | | 711/122 |
| 2013/0111149 A1 | 5/2013 | Moll et al. | |
| 2015/0261622 A1* | 9/2015 | Vlachogiannis | G06F 17/30221 |
| | | | 707/644 |
| 2016/0314069 A1 | 10/2016 | Luttrell et al. | |
| 2019/0079868 A1 | 3/2019 | Jalal et al. | |

OTHER PUBLICATIONS

Ravindra Kuramkote et al., "Analysis of Avalanche's Shared Memory Architecture," Technical Report UUCS-97-008, University of Utah, 1997.
Srinivasan Parthasarathy et al., "Shared State for Distributed Interactive Data Mining Applications," Distributed and Parallel Databases 11.2 (2002): pp. 129-155.
Adam Hraška, "Read-Copy-Update for HelenOS," Thesis, Charles University in Prague, 2013.
Jane H. Bartik et al., "Non-Coherent Read in a Strongly Consistent Cache System for Frequently Read But Rarely Updated Data", Related Application, U.S. Appl. No. 15/806,537, filed Nov. 8, 2017.
List of IBM Patents or Patent Applications Treated as Related; (Appendix P), Filed Nov. 10, 2017.

* cited by examiner

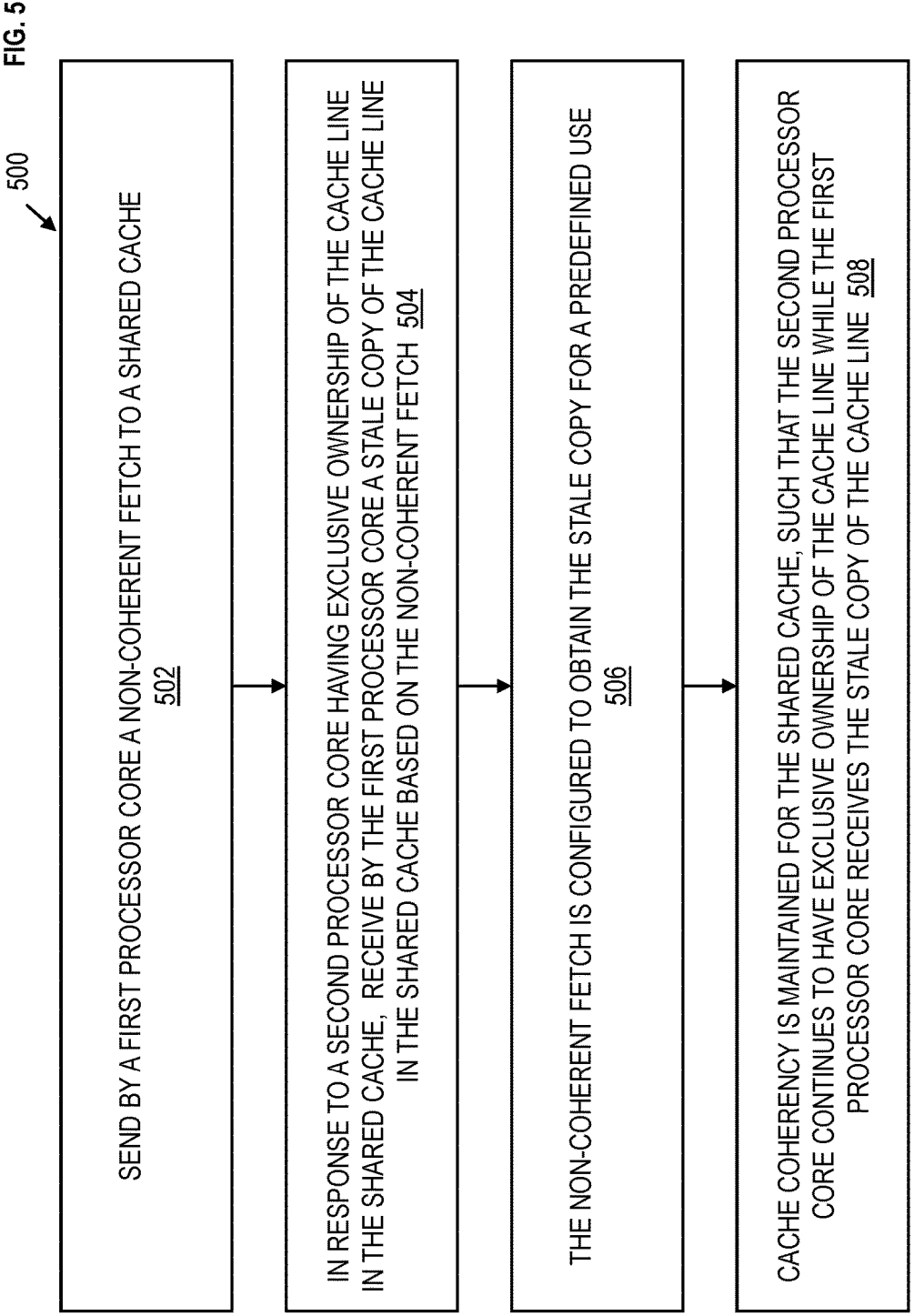

NON-COHERENT READ IN A STRONGLY CONSISTENT CACHE SYSTEM FOR FREQUENTLY READ BUT RARELY UPDATED DATA

BACKGROUND

The present invention generally relates to a cache system in a computer system, and more specifically, to high-performance non-coherent read (or fetch) in a strongly consistent cache system for frequently read but rarely updated data.

Strong consistency is one of the consistency models used in the domain of the concurrent programming (e.g., in distributed shared memory, distributed transactions, etc.). The protocol supports strong consistency if all accesses to the shared memory (e.g., shared cached) are seen by all parallel processes (or nodes, processors, etc.) in the same order (sequentially). Therefore, only one consistent state can be observed, as opposed to weak consistency, where different parallel processes (or nodes, etc.) can perceive variables in different states.

In computer science, consistency models are used in distributed systems like distributed shared memory systems or distributed data stores (such as file systems, databases, optimistic replication systems or Web caching). The system is said to support a given model if operations on memory follow specific rules. The data consistency model specifies a contract between programmer and system, in which the system guarantees that if the programmer follows the rules, the memory will be consistent and the results of memory operations will be predictable. This is different from cache coherence. Consistency is an issue (that occurs in systems that are cached or cache-less) and is about the consistency of data with respect to all processors. Consistency is not handled by coherence as coherence deals with maintaining a global order in which writes only to a single location or a single variable are seen by all processors. Consistency deals with the ordering of operations to multiple locations with respect to all processors.

SUMMARY

Embodiments of the present invention are directed to a computer-implemented method for enabling a multiprocessor computer system to make a non-coherent request for a cache line. A non-limiting example of the computer-implemented method includes sending by a first processor core a non-coherent fetch to a cache, and in response to a second processor core having exclusive ownership of the cache line in the cache, receiving by the first processor core a stale copy of the cache line in the cache based on the non-coherent fetch. The non-coherent fetch is configured to obtain the stale copy for a predefined use. Cache coherency is maintained for the cache, such that the second processor core continues to have exclusive ownership of the cache line while the first processor core receives the stale copy of the cache line.

Embodiments of the present invention are directed to a multiprocessor computer system making a non-coherent request for a cache line. A non-limiting example of the system includes a processing circuit and a storage medium readable by the processing circuit and storing instructions that, when executed by the processing circuit, cause the processing circuit to perform a method. A non-limiting example of the method includes sending by a first processor core a non-coherent fetch to a cache, and in response to a second processor core having exclusive ownership of the cache line in the cache, receiving by the first processor core a stale copy of the cache line in the cache based on the non-coherent fetch. The non-coherent fetch is configured to obtain the stale copy for a predefined use. Cache coherency is maintained for the cache, such that the second processor core continues to have exclusive ownership of the cache line while the first processor core receives the stale copy of the cache line.

Embodiments of the invention are directed to a computer program product for enabling a multiprocessor computer system to make a non-coherent request for a cache line, the computer program product comprising a computer readable storage medium having program instructions embodied therewith, where the computer readable storage medium is not a transitory signal per se. The program instructions are readable by the multiprocessor computer system to cause the multiprocessor computer system to perform a method. A non-limiting example of the method includes sending by a first processor core a non-coherent fetch to a cache, and in response to a second processor core having exclusive ownership of the cache line in the cache, receiving by the first processor core a stale copy of the cache line in the cache based on the non-coherent fetch. The non-coherent fetch is configured to obtain the stale copy for a predefined use. Cache coherency is maintained for the cache, such that the second processor core continues to have exclusive ownership of the cache line while the first processor core receives the stale copy of the cache line.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 5 depicts a flow chart of a computer-implemented method for enabling a multiprocessor computer system to make non-coherent requests according to embodiments of the present invention.

Figure 1:
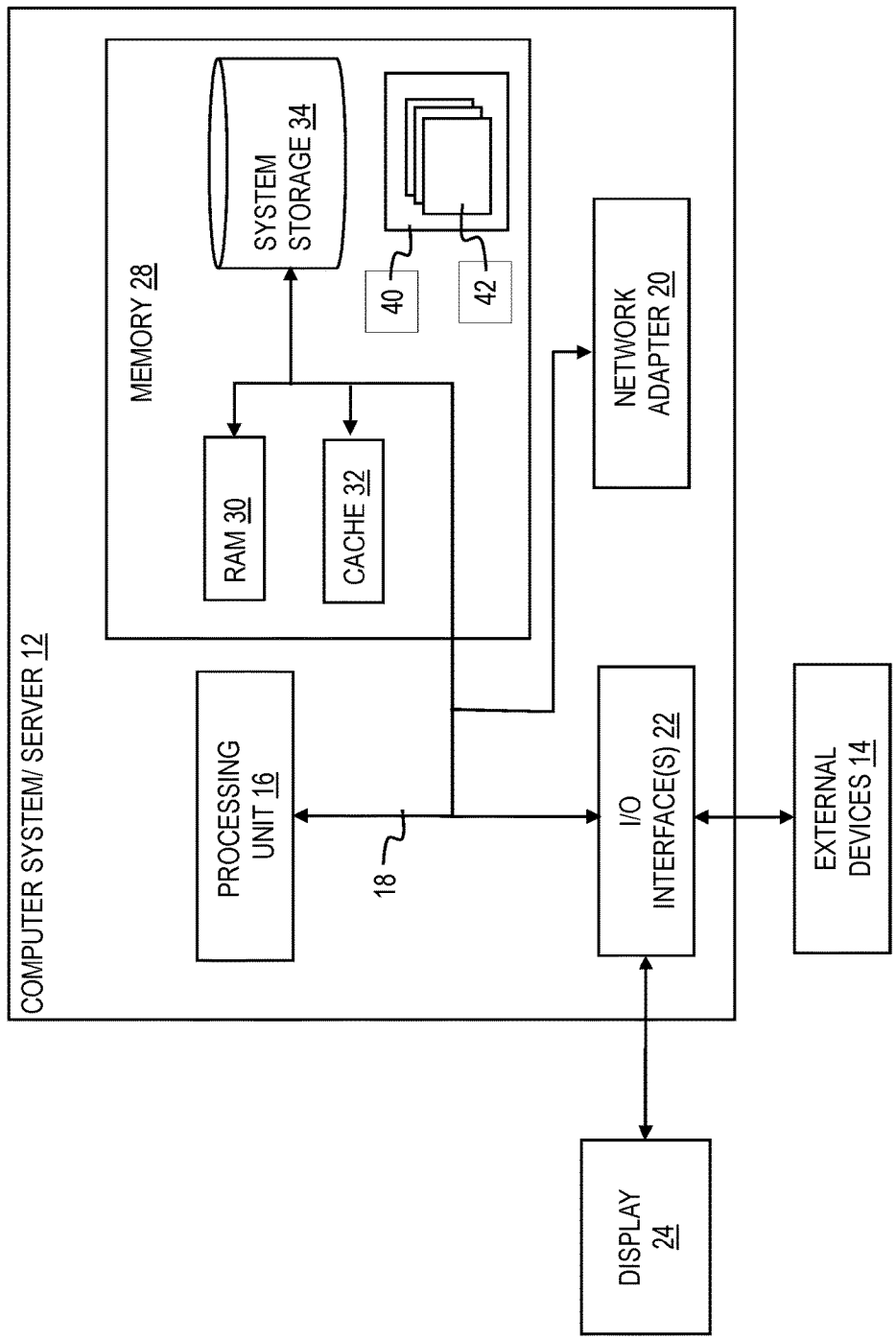
FIG. 1 depicts a schematic of an example computing node/system according to embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number corresponds to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, software has use cases where cache lines are frequently referenced by multiple processors, while one or more cores may be updating the state of the cache line. Referencing the cache line can be considered monitoring the cache line. These additional monitoring cores (which are referencing the cache line) generate interference to the mainline processing, and the monitoring cores may be polling the cache line for updates, but do not need the most recent copy of the data. This introduces multiprocessor scaling effects which can be problematic. For example, a dirty lock is stolen from an updating processor by another core's load and takes time for the initiating core (which was originally updating the cache line) to reacquire and unlock. In other words, a first core is updating the cache line, and a monitoring core requests and takes control of the cache line from the first core before the first core finishes its update to the cache line. However, the monitoring core only wants to poll the cache line in the example use case. State-of-the-art techniques across the industry recommend careful coding techniques to limit the damage, which essentially fixes the software constructs to work within the scope of the hardware design.

Turning now to an overview of the aspects of the invention, one or more embodiments of the invention address the above-described shortcomings of the prior art by providing a new "Dirty-Read Fetch" instruction. The Dirty-Read Fetch instruction is configured to facilitate multiple processors' attempts to read to a single (the same) cache line without interrupting existing operations of another processor (e.g., updating the cache line) by: 1) New Dirty-Read Fetch instruction (DR) which provides the requesting processor access to a copy of the cache line for a one-time reference with a snapshot of the current state in the nearest cache on a L1 miss (which could be stale). 2) Existing operations in flight to the cache line from other processor(s) would not be impacted.

The above-described aspects of the invention address the shortcomings of the prior art by providing processors and/or cache controllers having hardware, firmware, and/or microcode which uses the new Dirty-Fetch instruction to indicate a storage read that does not require the latest copy of the data. For example, a requesting processor makes a request for data, and if it hits (i.e., is successful) in the local private cache (L1/L2) in any state, the request returns data as usual. If the request misses in the local cache, the requesting processor sends a "dirty fetch" request to shared cache (L3). The dirty fetch in the Dirty-Read Fetch instruction. The shared cache (e.g., via the cache controller) returns data with a traditional state if there is no conflict to ownership, i.e., if the cache line is not owned exclusive (exclusive ownership) by another processor. On the other hand, the shared cache (e.g., via the cache controller) returns data with the "dirty" state if there is an ownership conflict, i.e., the cache line is owned exclusive by another processor and the other processor may be updating the cache line. After receiving the data of the cache line in the dirty state, the requesting processor now marks its local cache to have its own state as "dirty fetch" (DNC) and returns data to pipeline usage. On the next instruction fetch to a cache line with a "dirty fetch" state (in the local cache of the requesting processor) this request to the cache line having the direct fetch is treated as a miss, and the local cache of the requesting processor will request the cache line from the shared cache in traditional way. In other words, the dirty/stale copy of the cache line that has been brought back to the local cache (L1/L2) of the requesting processor is (only) used once, and the dirty cache line in the local cache cannot be used again, thereby resulting in a miss at the local cache for the dirty cache line.

Additionally, embodiments improve the functioning of the computer by improving the cache memory system such that a processor is not interrupted from updating a cache line when other processors only need a stale/copy of the cache line. This reduces processing time be avoiding unnecessary interruptions.

Turning now to a more detailed description of aspects of the present invention, FIG. 1 depicts a schematic of an example computing node according to embodiments of the present invention. The computing node includes a computer system/server 12, which can be operational with numerous other general purpose or special purpose computing system environments or configurations. The optimization can be included in a server, mainframe, etc., and the computer system/server 12 can be representative of various types of computer systems on which the optimization (and query) can run.

Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The components of computer system/server 12 may include, but are not limited to, one or more processors or processing units 16, a system memory 28, and a bus 18 that couples various system components including system memory 28 to processor 16. Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media. The system memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. Memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include but are not limited to: microcode, device drivers, redundant processing units, external disk drive arrays, RAID systems, tape drives, and data archival storage systems, etc.

Figure 2:
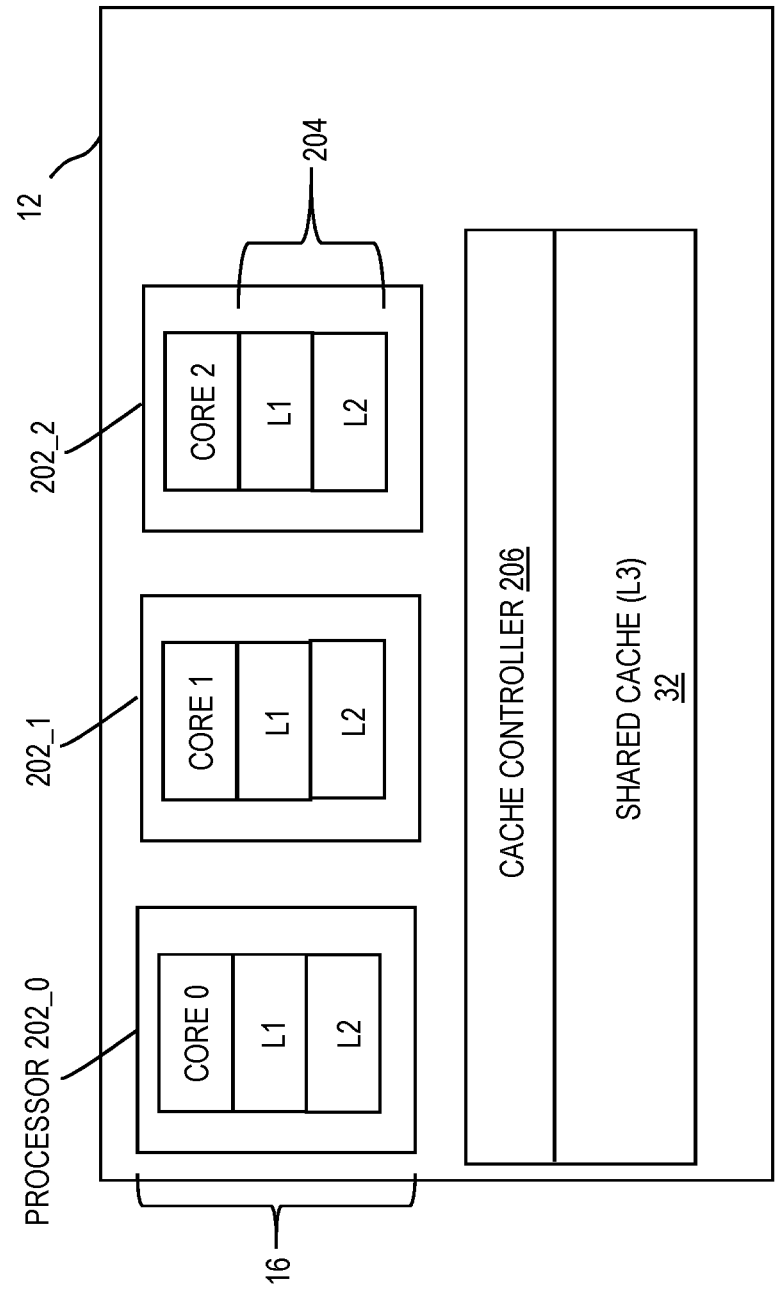
FIG. 2 depicts a simplified view of the computer system/server according to embodiments of the present invention.

FIG. 2 depicts a simplified view of the of the computer system/server 12 according to embodiments of the present invention. Accordingly, some elements of the computer system/server 12 are not shown so as not to obscure the figure. However, additional detail of the processing unit 16 is illustrated for example purposes. FIG. 2 shows details of the processing unit 16 which is a multiprocessor (processing circuitry). For simplification, only three processors 202_0 through 202_2 of the multiprocessor 16 are shown, and it is understood that the multiprocessor 16 can have more than three processors. Processor 202_0 has one or more cores, and core 0 is illustrated. Processor 202_1 has one or more cores, and core 1 is illustrated. Similarly, processor 202_2 has one or more cores, and core 2 is illustrated. Each processor 202 has its own local cache 204. The local cache 204 of processors 202_0 through 202_2 can each include a local cache L1 and a local cache L2. Some processors may only have an L1 cache. If both the L1 and L2 caches are present, the L1 cache is closer to the processor core.

FIG. 2 also illustrates a cache controller 206. The cache controller is a device which is used to control the transfer of data between the processor, main memory, and the cache memory.

The shared cache 32 is designed with strong consistency in which the cache controller 206 and/or processors 202 have hardware/software protocol to support strong consistency such that all accesses to the shared memory (e.g., shared cached 32) are seen by all parallel processes (or nodes, processors 202, etc.) in the same order (sequentially). Therefore, only one consistent state can be observed for each cache line where different parallel processes (or nodes, etc.) can perceive variables in different states.

A scenario is provided below. There are many cases in a computer system where values such as counters or tokens are read or fetched at a high frequency but are actually updated at a low frequency. A token is an object (in software or in hardware) which represents the right to perform some operation. A counter can increase each time a count is taken of a specified item or instruction. If the data requested is in the L1 cache when reading, then the fetch is fast. However, if data is not frequently in the L1 cache due to other activity that uses the L1 cache forcing the value out, then the next fetch will incur a cache miss at the L1 cache. Because the data is read frequently, the overhead of the cache miss can be significant. For users/applications where the value does not have to be perfectly accurate like performance monitors collecting data, this overhead can be significant. In most cases, performance monitors do not require that the data be perfectly accurate or coherent. As such, a non-coherent value which is close to the current value is sufficient. Given the frequency that the performance monitors are reading data, using the non-coherent value (which is a stale copy) would be close enough to the current value (i.e., the actual value). A performance monitor is a software program executed by any of the processors 202 which allows a computer user and/or the monitoring program to view and monitor the performance of the computer system 12 either in real time or from a log.

The shared cache 32 (and the memory 28 in general) can operate under the MESI protocol as understood by one skilled in the art. The MESI protocol is an Invalidate-based cache coherence protocol, and is one of the most common protocols which support write-back caches. By using write back caches, one can save a lot on bandwidth which is generally wasted on a write through cache. There is always a dirty state present in write back caches which indicates that the data in the cache is different from that in main memory. The protocol requires cache to cache transfer on a miss if the block resides in another cache. The letters in the acronym MESI represent four exclusive states that a cache line can be marked with (encoded using two additional bits):

Modified (M): The cache line is present only in the current cache, and is dirty (i.e., it has been modified (M state) from the value in main memory). The cache is required to write the data back to main memory at some time in the future, before permitting any other read of the (no longer valid) main memory state. The write-back changes the line to the Shared state (S).

Exclusive (E): The cache line is present only in the current cache, but is clean (i.e., it matches main memory). It may be changed to the Shared state at any time, in response to a read request. Alternatively, it may be changed to the Modified state when writing to it.

Shared(S): Indicates that this cache line may be stored in other caches of the machine and is clean—it matches the main memory. The line may be discarded (changed to the Invalid state) at any time.

Invalid (I): Indicates that this cache line is invalid (unused).

Figure 3:
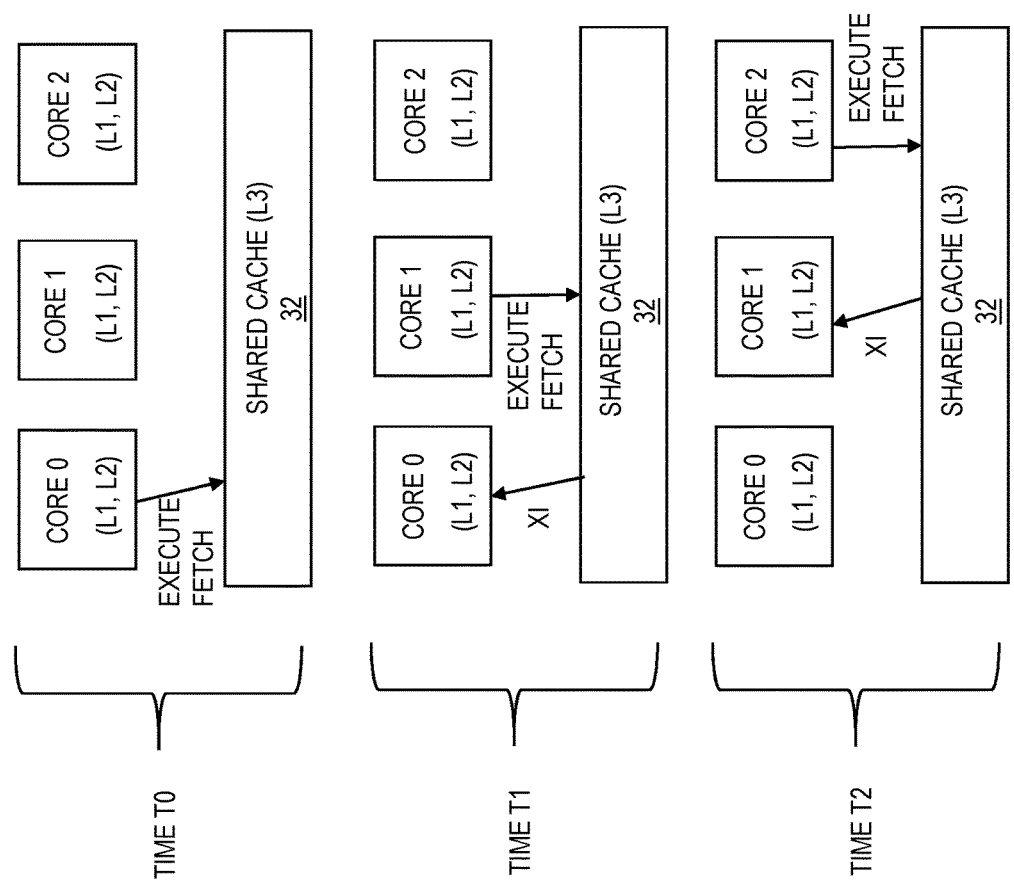
FIG. 3 depicts an example of an exclusive fetch.

FIG. 3 depicts a scenario using the MESI protocol which can occur in the state-of-the-art. The times are illustrated as time T0, time T1, and time T2 in which T0<T1<T2. FIG. 3 depicts exclusive fetching by 3 different processors/cores. An exclusive fetch is a processor fetch with intent to modify the contents of a cache line. FIG. 3 depicts a simplified version of processors 202 and the shared cache 32. The cache controller 206 is not shown. Also, the assumption is that there is a global counter in the shared cache.

At time T0, the core 0 executes an exclusive fetch to cache line A in the shared cache 32, because there was a cache miss in the local caches L1, L2 of the core 0. There is a cache hit in the shared cache 32 (L3), and the core 0 receives exclusive ownership of the shared cache 32. Upon receiving the exclusive ownership of the cache line, core 0 can now store into line A (1 store, hot global counter). For example, the core 0 is in the process of bringing line A back to the core 0 in order to store line A (i.e., store the value/data) in the local cache (L1 and/or L2) of core 0.

At time T1, core 1 executes an exclusive fetch to cache line A in the shared cache 32 because there was a cache miss in the local caches L1, L2 of the core 1, and there is a cache hit in the shared cache 32 (L3). Upon core 1 initiating the exclusive fetch and upon core 1 hitting on the cache entry in the L3 shared cache 32, due to MESI coherency protocols, a cross-invalidate (XI) request is sent to core 0 to request that the processor relinquish ownership of the cache line A. In other words, the core 0 receives the cross-invalidate (XI) to invalidate previous copies of the data in the local caches that relate to the cache line A. The core 0 is in the process of performing a compare and swap such that the value of the cache line A brought in from the shared cache 32 is to be compared to the previous value in the local cache (L1 and/or L2), and the value of cache line A will be stored in the local cache of core 0 if the values of cache line A and the local cache are different. However, no store is able to occur in the local cache of core 0 because core 1 has now taken exclusive ownership of cache line A in the shared cache 32 away from core 0, and thus the compare and swap procedure fails (i.e., the compare and swap was interrupted before completion so no store occurs).

At time T2, core 2 executes an exclusive fetch to cache line A in the shared cache 32 because there was a cache miss in the local caches L1, L2 of the core 2, and there is a cache hit in the shared cache 32 (L3). Upon core 2 initiating the exclusive fetch and upon core 2 hitting on the cache entry in the L3 shared cache 32, due to MESI coherency protocols, a cross-invalidate (XI) request is sent to core 1 to request that the processor relinquishes ownership of the cache line A. In other words, core 1 receives a cross-invalidate (XI) to invalidate previous copies of the data in the local caches that relate to the cache line A. The core 1 is in the process of performing a compare and swap such that the value of the cache line A brought in from the shared cache 32 is to be compared to the previous value in the local cache (L1 and/or L2) and the value of cache line A will be stored in the local cache of core 1 if the values of cache line A and the local cache are different. However, no store is able to occur in the local cache of core 1 because core 2 has now taken exclusive ownership of the shared cache 32 away from core 1, and thus the compare and swap procedure fails (i.e., the compare and swap was interrupted before completion so no store occurs).

Figure 4:
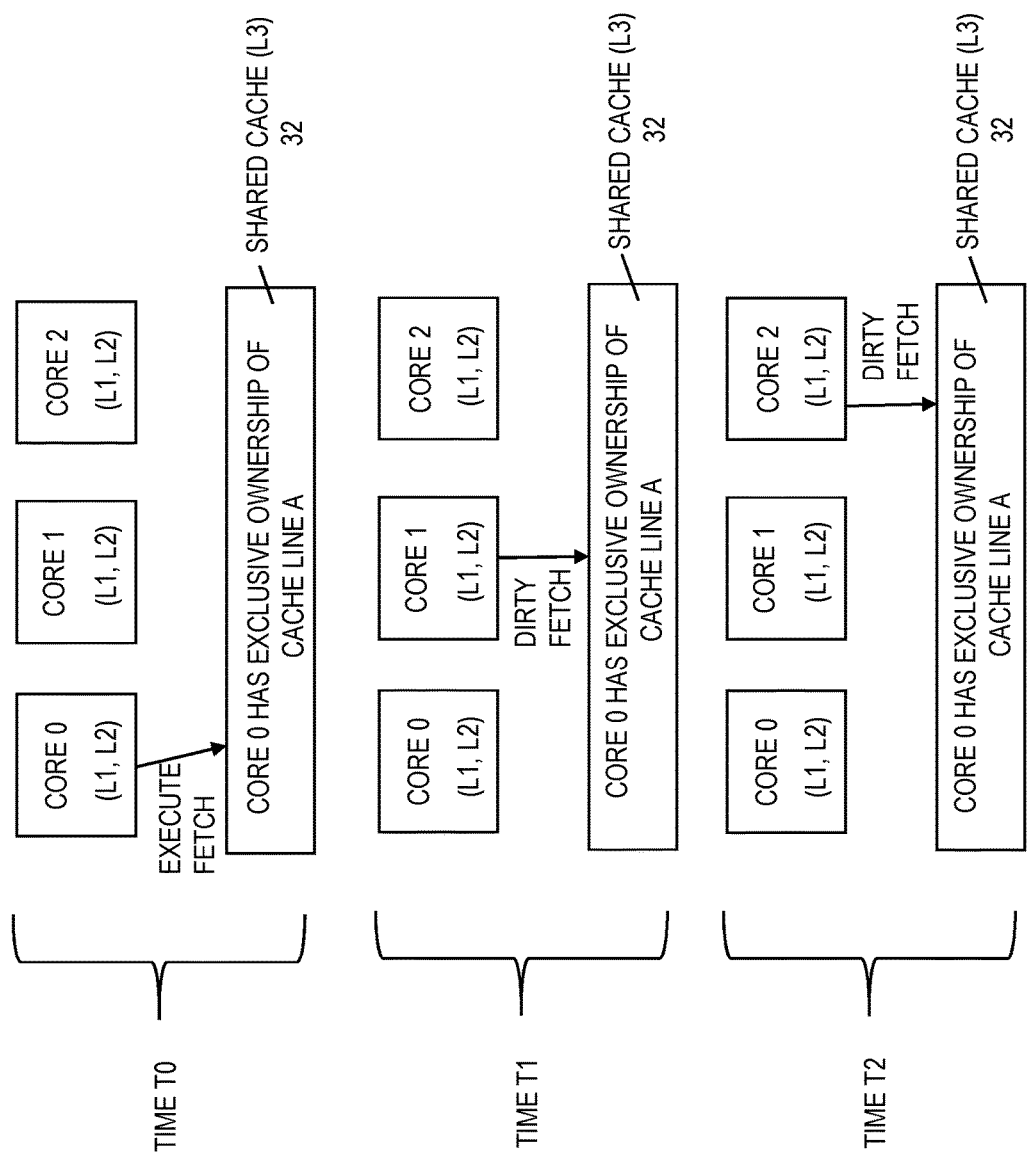
FIG. 4 depicts an example of a non-coherent fetch according to embodiments of the present invention.

FIG. 4 depicts a scenario using the MESI protocol and the new Dirty-Read Fetch instruction according to embodiments of the present invention. FIG. 4 uses the same scenario as FIG. 3 but uses the New Dirty-Read Fetch instruction instead of the exclusive fetch. Similarly, the times T0, T1, and T2 are illustrated in which T0<T1<T2, and FIG. 4 depicts fetching by 3 different processors/cores. FIG. 4 depicts a simplified version of processors 202 and the shared cache 32, without showing the cache controller 206. Again, it is assumed that there is a global counter in the shared cache on at least one bit of the cache line A.

At time T0 (as discussed above), the core 0 executes an exclusive fetch to cache line A in the shared cache 32, because there was a cache miss in the local caches L1, L2 of the core 0. There is a cache hit in the shared cache 32 (L3), and the core 0 receives exclusive ownership of the shared cache 32. The core 0 is configured to store line A (1 store, hot global counter). For example, core 0 is in the process of bringing line A back to the core 0 in order to store line A (i.e., stored the value/data) in the local cache (L1 and/or L2) of core 0.

At time T1, core 1 executes a Dirty-Read Fetch instruction to cache line A in the shared cache 32 because there was a cache miss in the local caches L1, L2 of the core 1, and there is a cache hit in the shared cache 32 (L3). Because core 1 now executes a Dirty-Read Fetch instruction, no cross-invalidate (XI) is sent to core 0. As noted above, to facilitate multiple processors' attempting to read to a single cache line without interrupting existing operations of core 0, the Dirty-Read Fetch instruction is configured to allow the requesting processor (e.g., core 1) access to a copy of the cache line A for a one-time reference/use with a snapshot of the current state/value (which could be stale/old). Therefore, existing operations in flight to the cache line A from other processors, such as core 0, are not be impacted/interrupted. Accordingly, core 0 is in the process of performing a compare and swap such that the value of the cache line A brought in from the shared cache 32 is to be compared to the previous value in the local cache (L1 and/or L2), and the value of cache line A will be stored in the local cache of core 0 if the values of cache line A and the local cache are different. Unlike FIG. 3, FIG. 4 shows that the store occurs in the local cache of core 0 because core 1 does not take exclusive ownership of the cache line A in shared cache 32 away from core 0. Instead, core 0 is allowed to complete the compare and swap procedure (i.e., the compare and swap is not interrupted), and the core 0 stores the value of the cache line A to the local cache L1 and/or L2. Back to core 1, core 1 receives the stale/dirty copy of the cache line A using the Dirty-Read Fetch instruction, and core 1 stores and marks this stale copy in its local cache (L1 and/or L2) as do not copy state (one time use only) such that any subsequent fetch to the local cache of core 1 (for the stale copy) results in a cache miss. This means that any subsequent fetch to the local cache (L1, L2) for the stale copy will then result in a fetch to the shared cache 32 (L3).

At time T2, core 2 executes a Dirty-Read Fetch instruction to cache line A in the shared cache 32 because there was a cache miss in the local caches L1, L2 of the core 1, and there is a cache hit in the shared cache 32 (L3). As noted above, no cross-invalidate (XI) is sent to core 1. The core 2 receives the stale/dirty copy of the cache line A using the Dirty-Read Fetch instruction, and the core 2 stores and marks this stale copy in its local cache (L1 and/or L2) as do not copy state (one use only) such that any subsequent fetch to the local cache of core 2 (for the stale copy) results in a cache miss. This means that any subsequent fetch to the local cache of core 2 for the stale copy will then result in a fetch to the shared cache 32 (L3).

The core 0 continues to have exclusive ownership of the cache line A of the shared cache 32 even after the Dirty-Read Fetch instructions have been requested for cache line A by cores 1 and 2.

As can be seen, the Dirty-Read Fetch instruction protocol enables the processor core updating cache line to maintain 'write' access to a shared cache line while other processor cores can 'snoop' for updates without stealing the cache line. Embodiments eliminate the need for XI's (cross-invalidates) and serialization overhead until an appropriate point of intervention is attained. The Dirty-Read Fetch instruction does not violate cache coherency, because in the scenario above only core 0 is able to update the cache line A (i.e., core 0 has exclusive ownership) in the shared cache L3 but the cores 1 and 2 only inspect the cache line. After performing the dirty read via the Dirty-Read Fetch instruction, the cores 1 and 2 can optionally store a private copy of the cache line A back to their respective local caches and/or the cores 1 and 2 do not have to install the dirty copy.

The Dirty-Read Fetch instruction can be utilized in a situation in which the cores 1 and 2 are executing a monitoring program, and the monitoring program can be a program 42 in the memory 28 of the computer system 12. The monitoring program may only need to make a comparison to the stale copy (value) to check whether the value has reached a predefined threshold. The cache controller 206 is configured to perform Dirty-Read Fetch instruction in cooperation with the processor 202.

FIG. 5 depicts a flow chart of a computer-implemented method for enabling a multiprocessor computer system 12 to make a non-coherent request for a cache line (e.g., cache line A) according to embodiments of the present invention.

At block 502, a first processor core (e.g., core 1 of the multiprocessor cores 16) sends a non-coherent fetch (e.g., Dirty-Read Fetch instruction) to a shared cache 32. For example, the non-coherent fetch instruction can be sent to the cache controller 206 of the shared cache 32 from the core 1 as discussed in the example scenario above.

At block 504, in response to a second processor core (e.g., core 0 of the multiprocessor cores 16) having exclusive ownership of the cache line (e.g., cache line A) in the shared cache 32, the first processor core receives a stale copy of the cache line in the shared cache based on the non-coherent fetch. For example, the core 1 receives a stale copy of cache line A from the cache controller 206 in accordance with the non-coherent fetch.

At block 506, the non-coherent fetch is configured to obtain the stale copy for a predefined use. At block 508, cache coherency is maintained for the shared cache 32, such that the second processor core continues to have exclusive ownership of the cache line while the first processor core receives the stale copy of the cache line. For example, core 0 continues to have exclusive ownership of the cache line A even while cores 1 and 2 respectively obtain a stale copy of cache line A by issuing Dirty-Read Fetch instructions.

The predefined use is a single use for the stale copy. The predefined use limits/restricts use of the stale copy by the first processor core (e.g., core 1) to comparing a value of the stale copy to a predefined value (which may be in a register of core 1). The stale copy is discarded if the value of the stale copy does not reach a threshold of the predefined value, and if the value of the stale copy does reach the threshold of the predefined value, the first processor core (e.g., core 1) is configured to send an exclusive fetch to the shared cache such that the first processor core can obtain exclusive ownership of the cache line in the shared cache. The exclusive fetch is a normal fetch instruction that gives exclusive ownership to core 1.

The predefined use permits the second processor core (e.g., core 0 from the scenario above) to store the stale copy in a local cache 204, such as L1 and/or L2. A cache line of the local cache 204 having the stale copy is marked dirty by the first processor core (e.g., core 1), such that any subsequent fetch to the local cache (of core 1) for the stale copy results in a cache miss based on the predefined use. When the second processor (e.g., core 0) makes updates to the (value of the) cache line (cache line A), the (value of the) stale copy received by the first processor (e.g., core 1) is different from the (value of the) cache line updated by the second processor core.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer program product for enabling a multiprocessor computer system to make a non-coherent request for a cache line in a cache, the computer program product comprising a computer readable storage medium having program instructions embodied therewith, wherein the computer readable storage medium is not a transitory signal per se, the program instructions readable by the multiprocessor computer system to cause the multiprocessor computer system to perform a method comprising:

sending by a first processor core a non-coherent fetch to the cache; and in response to a second processor core having exclusive ownership of the cache line in the cache, receiving by the first processor core a stale copy of the cache line in the cache based on the non-coherent fetch concurrently with maintaining cache coherency, such that the second processor core continues to have the exclusive ownership of the cache line in the cache, the exclusive ownership being different from a shared state, while the first processor core receives the stale copy of the cache line;

wherein the non-coherent fetch is configured to obtain the stale copy for a predefined use; and wherein the predefined use is a single use for the stale copy.

2. The computer program product of claim 1, wherein the predefined use limits use of the stale copy by the first processor core to comparing a value of the stale copy to a predefined value.

3. The computer program product of claim 1, wherein the cache is a shared cache system.

4. The computer program product of claim 1, wherein the predefined use permits the second processor core to store the stale copy in a local cache.

5. The computer program product of claim 4, wherein a cache line of the local cache having the stale copy is marked invalid, such that any subsequent fetch to the local cache for the stale copy results in a cache miss based on the predefined use.

6. The computer program product of claim 1, wherein, when the second processor core makes updates to the cache line, the stale copy received by the first processor core is different from the cache line updated by the second processor core.

7. A multiprocessor computer system making a non-coherent request for a cache line in a cache, the multiprocessor computer system comprising:

processing circuitry; and a storage medium readable by the processing circuitry and storing instructions that, when executed by the processing circuitry, cause the processing circuitry to perform a method comprising:

sending by a first processor core a non-coherent fetch to the cache; and in response to a second processor core having exclusive ownership of the cache line in the cache, receiving by the first processor core a stale copy of the cache line in the cache based on the non-coherent fetch concurrently with maintaining cache coherency, such that the second processor core continues to have the exclusive ownership of the cache line in the cache, the exclusive ownership being different from a shared state, while the first processor core receives the stale copy of the cache line;

wherein the non-coherent fetch is configured to obtain the stale copy for a predefined use; and wherein the predefined use is a single use for the stale copy.

8. The multiprocessor computer system of claim 7, wherein the predefined use limits use of the stale copy by the first processor core to comparing a value of the stale copy to a predefined value.

9. The multiprocessor computer system of claim 7, wherein the cache is a shared cache system.

10. The multiprocessor computer system of claim 7, wherein the predefined use permits the second processor core to store the stale copy in a local cache.

11. The multiprocessor computer system of claim 10, wherein a cache line of the local cache having the stale copy is marked invalid, such that any subsequent fetch to the local cache for the stale copy results in a cache miss based on the predefined use.

* * * * *